April 28, 1925.
P. L. CLARK
1,535,985
PROJECTION SCREEN
Filed Aug. 27, 1920
2 Sheets-Sheet 1
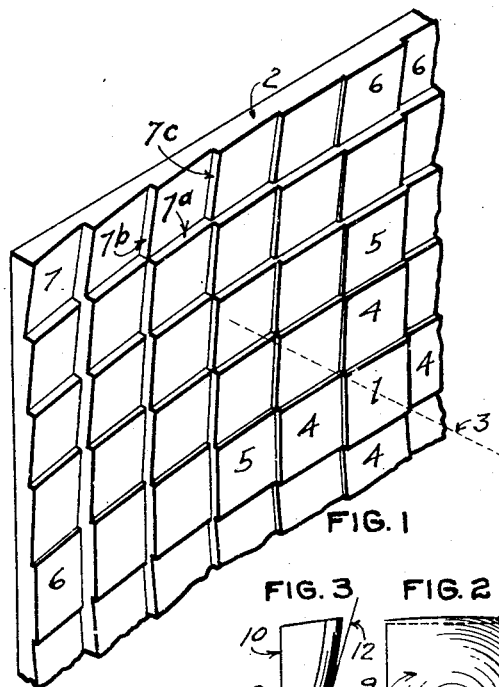
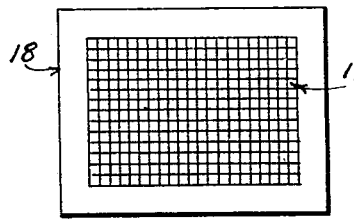
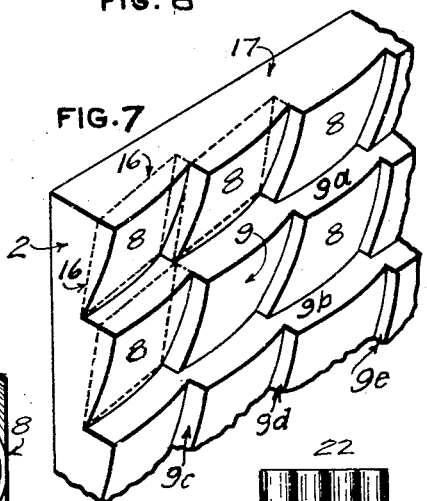
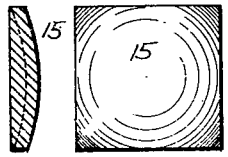
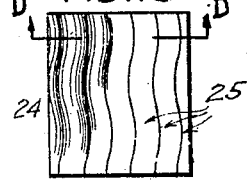
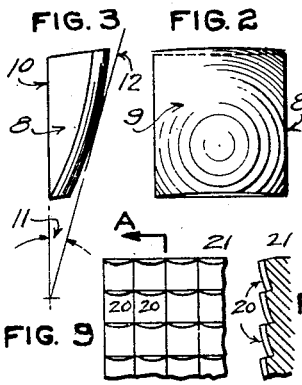
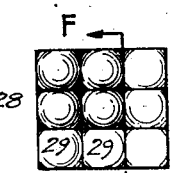
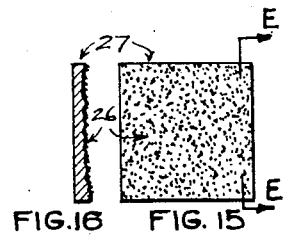
INVENTOR.
Paul L. Clark.

April 28, 1925.  1,535,985
P. L. CLARK
PROJECTION SCREEN
Filed Aug. 27, 1920   2 Sheets-Sheet 2
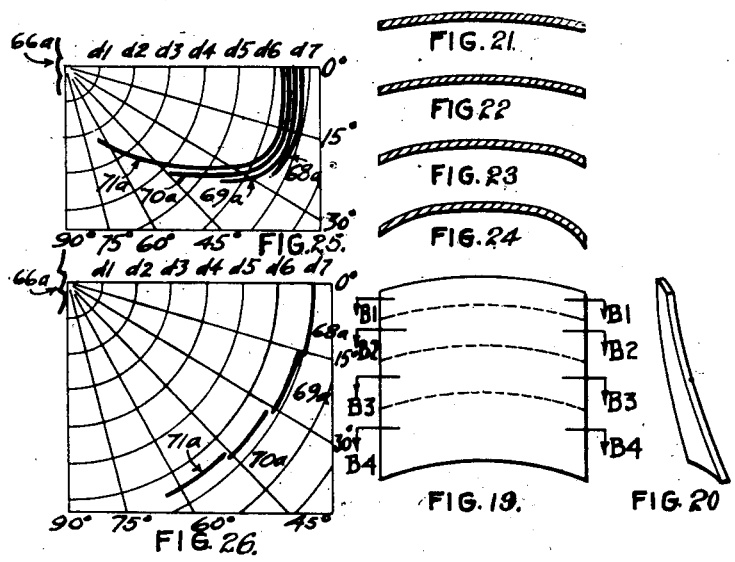
INVENTOR
Paul L. Clark Patented Apr. 28, 1925.

1,535,985

UNITED STATES PATENT OFFICE.

PAUL L. CLARK, OF DENVER, COLORADO.

PROJECTION SCREEN.

Application filed August 27, 1920. Serial No. 406,382.

*To all whom it may concern:*

Be it known that I, PAUL L. CLARK, a citizen of the United States, residing at Denver, in the county of Denver and State of Colorado, have invented new and useful Improvements in Projection Screens, of which the following is a specification.

My invention relates to projection screens.

One object of the present invention is to provide a novel reflecting surface specially adapted for the improved screen. A second object is the provision of a flat or plane projection or reflection structure having the advantages of a concave (spherical, paraboloidal, etc.,) surface, but without its constructional and physical disadvantages. Additional objects and novel features are shown and described in the accompanying drawings and specification, and further pointed out in the claims.

In the drawings, Fig. 1 is a perspective view of part of the basic structure of the screen; Fig. 2 is a front elevation of a typical element, one or more of which, in a finished screen, would be superimposed upon the flat bases of the structure shown in Fig. 1; Fig. 3 is a side elevation of Fig. 2; Figs. 4, 5 and 6 are a front elevation, a section on B—B, Fig. 6, and an end elevation of a modified type of element; Fig. 7 is a perspective view of the same structure shown in Fig. 1, but with the addition of the elements, Fig. 2. Fig. 8 is a front elevation of a complete reflecting structure, surrounded by a border or frame. Fig. 9 is a front elevation of a combination of identical elements, such combination being designed to take the place of a single element, Fig. 2. Fig. 10 is a section on A—A, Fig. 9. Figs. 11 and 12 are a front elevation and section C—C, Fig. 11. Figs. 13 and 14 are a front elevation and section D—D, Fig. 13. Figs. 15 and 16 are a front elevation and section E—E, Fig. 15. Figs. 17 and 18 are a front elevation and section F—F, Fig. 17. Figs. 11 to 18, inclusive, are views of different modifications of elements adapted for superimposition upon, or to be made integral with the structure shown in Fig. 1. Fig. 19 is a front elevation of a special form of reflecting element. Fig. 20 is a side elevation, and Figs. 21, 22, 23 and 24 are respectively sectional views of Fig. 19 on B¹—B¹, B²—B², B³—B³ and B⁴—B⁴. Figs. 25 and 26 are a plan and elevation, showing in polar co-ordinates, the dispersion from the element, Fig. 19. Fig. 27 is a front elevation of a modified type of screen, provided with oblique rings either eccentric or concentric; and Fig. 28 is a section J—J, Fig. 27.

In Fig. 1, 1 is a plane surface or facet parallel to the general plane of the sheet 2, and perpendicular to the axis 3 passing through its centre. The elements 4 are slightly inclined to the element 1; the elements 5 are slightly more inclined; and so on out to the last row of elements, the obliquity of each element with relation to the general surface increasing in proportion to its distance from the central axis 3; or, considering 2 as a projection surface (or other reflecting surface) illuminated from a single light source, the obliquity of the elements increases in direct proportion to the magnitude of the angle of incidence of the rays falling upon the surface, so that if each surface surrounding 1 were moved forwardly without changing its slant, until its nearest corner were against the corner of the surface next to it, the front surface would be curved almost spherically; or, to be more exact, the curvature would be portions of concentric spheres, the element 7 being tangent to the surface of greatest radius, and element 1 tangent to the surface of least radius. The facets are joined by surfaces 7ª, 7ᵇ, 7ᶜ, substantially normal to the surfaces of adjacent elements or facets, and of depth gradually increasing from the axis 3, outwardly; the depths of the vertical and horizontal joining surfaces being proportional to their distance respectively from a vertical and horizontal plane which planes are normal to the structure 2 and intersect the axis 3. It should be understood that surfaces of revolution other than spherical are equally applicable, and considered as being within the scope of this invention. A surface such as that here shown when provided with polished facets as described, would reflect rays from a given source in front of it in a manner identical with that of a spherical or parabolic reflector, and the screen, Fig. 1, would have a substantial focus, the same as a concave reflector. Since the object of the reflecting plates herein described is to disperse and not to too greatly concentrate the reflected light, I provide curved reflecting elements, generally equally oblique to the facets, as in Figs. 7, 9, 13 and 14. Although the facet 1 is above described as being at the centre of the sheet 2, it can be anywhere on or off the sheet, since any portion of the structure comprising the sheet may be used; nor is it essential that the sheet be always symmetrical with respect to the axis 3. The size of the facets need not necessarily be identical, although on a single screen for symmetrical dispersion and illuminated from a light source having substantially uniform dispersion characteristics, it will be found preferable ordinarily to have the facets small, say, about one-sixteenth inch, and of uniform size. The reflecting sheets may be formed from thin metal, coated fabric, composition material or the like.

In Figs. 2 and 3, the element 8 is wedge-shaped, with a convex front reflecting surface 9 and a flat back surface 10. The angle 11, between the flat back and the plane 12 which is tangent to the middle point of the face 9 is determined by the desired inclination of the mean ray of light reflected by the said face, while the curvature of 9 controls the dispersion. The face 9 may be either diffusely or specularly reflecting or a combination of them in any desired ratio. In determining the curvature or obliquity of a surface such as 9, or the obliquity of the facets 4, 5, etc., Fig. 1, upon which they are designed to be superimposed, the relative position of the projector with reference to the surface, the viewing angle, and other factors relating to the calculation of the dispersion of light by specular elements and screens, reference may be had to applicant's Patents 1,122,192 and 1,279,262.

In Figs. 4, 5 and 6 the element 15 has a convex reflecting face and is symmetrical with respect to a central axis.

In Fig. 7 identical elements 8 are shown integral with or combined with the structure 2, the dotted lines 16 indicating the planes of the facets 4, 5, 6, 7, Fig. 1. It is seen that each element 8 is tipped downwardly, i. e., the edge of the wedge is at the bottom, and all elements are similarly related to the aforesaid facets, so that the complete device 17, when properly positioned and receiving rays from a source in focus with it, will reflect the rays downwardly and each element will disperse the light through a predetermined solid angle and in a predetermined direction. Generally the screen will be symmetrical with respect to a vertical plane through its centre, and the light source or lantern will be located in this plane. Rows equidistant to this plane, at the right and left, will be symmetrical with respect to said plane; but not symmetrical with respect to a central horizontal plane. The angle between a plane tangent to any given point on the curved reflecting surface of one of the elements 8 and the plane of the back of the element is preferably identical ("$k$," in the formula below) for all elements on the screen (or, at least for elements on parts of the screen symmetrical with respect to a normal vertical plane through the centre of said screen). The angle ("$L$," in the following formula) between the base of the element and the general plane of the screen is substantially directly proportional to its distance (in degrees curvature or linear units) from the central axis of the screen. Consequently, it may be stated that generally the angle ("$X$," in the following formula) formed between a plane tangent to the surface of any element at a given point and the general plane of the screen is equal to $\pm(L\pm k)$, or, $X=\pm(L\pm k)$, the "$\pm$" sign in the parenthesis depending upon whether the plane is tangent upon a point at the right or left of the centre of the element; and the "$\pm$" sign outside the parenthesis being to give a positive value to the equation, in case $L\pm k$ is negative. All the elements are of such curvature and positioned at such angles with relation to the rays of light incident upon their surfaces that the beams reflected from and dispersed by them are in the same general direction (preferably, with their axes converging) thereby producing a definite viewing zone for observation of the illuminated surface as a whole. The structure, Fig. 7, although preferably plane, may be bent or moulded into a slightly concave or convex spherical or cylindrical surface, in order to attain the utmost refinements of dispersion, or to suit conditions not entirely satisfied by the design of a given screen, or to change the focal plane of the said screen.

In Fig. 8, the frame 18 is integral with or independent of the reflecting body 17.

In Figs. 9 and 10, a plurality of small elements 20 are shown juxtaposed in a small bank equal in area to that of one of the facets 4, 5, 6, Fig. 1. The bank 21 may have its back surface either parallel to or oblique to the general plane of the front surface. A number of these banks equal to the number of facets on the sheet 2, Fig. 1, would be required to form a complete reflector of the form shown in Fig. 7.

In Figs. 11 and 12, the block 22 is provided with a plurality of cylindrical surfaces 23, its use being the same as that described for the block, Figs. 9 and 10; the dispersion from the surfaces 23 will be through a wide angle horizontally and a narrow angle vertically.

In Figs. 13 and 14 the block 24 is provided with a plurality of undulating or wavy elements 25, of the proper curvature and having a reflecting surface to effect the desired dispersion of light rays.

In Figs. 15 and 16 the surface 26 of the block 27 is roughened and represents either a matt, a semi-reflecting, or a combination of matt and semi-reflecting surfaces, or such a surface as ground glass in front of a silvered back (as used on so-called mirror screens), or surfaces in which the specular dispersion characteristics are marked, if not predominant.

In Figs. 17 and 18 the block 28 is wedge-shape and its front reflecting surface is composed of a plurality of juxtaposed, curved surfaces 29 having conjunctive, polygonal peripheries. Any type, combination of types or modifications thereof, of the reflecting elements or screen surface, disclosed in applicant's patents, above mentioned, may be used in place of the surfaces 29.

In Figs. 19 to 24, inclusive, it is seen that the element is slightly concave and of uniform curvature at the top, the portion of uniform curvature gradually diminishing in each section, the outside being gradually increased in degrees of curvature, to produce a greater sidewise dispersion. A reflecting structure composed of elements of this type will produce a light dispersion as shown in Figs. 25 and 26, and is advantageous for use in theatres having one floor and one or more balconies.

In Fig. 25, a half-plan, and Fig. 26, a substantially complete elevation, the comparative extent and relative intensities of light reflected by the element shown in Figs. 19 to 24 are shown approximately. Curves $68^a$, $69^a$, $70^a$, $71^a$, represent the light dispersion from the portions of the element shown respectively in Figs. 21, 22, 23 and 24. The vertical dispersion is seen to be uniform, while the horizontal dispersion is most intensive a long distance from the element $66^a$, so that a spectator near the outer edge of the viewing space will see a picture much brighter than if the element $66^a$ were spherical (in which case it would distribute the light substantially equal in all directions). The uniformly-spaced, concentric arcs $d^1$, $d^2$, $d^3$, etc., represent spherical surfaces, their centres being at $66^a$; and the radial lines 0°, 15°, 30°, etc., represent degrees horizontally from the axis of the element $66^a$, in Fig. 25, and degrees vertically, in Fig. 26, from the said element. It should be understood that these curves show only the relative intensity of the light at different angles and not the intersection of the reflected light with the viewing plane or surface, the determination of these intersection curves being described in applicant's Patent 1,279,262.

In Figs. 27 and 28 the concentric conical rings 77 gradually increase in obliquity from the centre 76 outwardly, the angles of their generating lines corresponding to the angles determined for the facets, Fig. 1. In making a screen of this type the backing may be of plastic material, or machined or stamped out of metal, leaving smooth conical surfaces, these surfaces being covered by concentric rings of any desired type of reflecting structure, or painted metallically. In order to keep the screen comparatively flat it is essential that the widths of the rings decrease from the centre outwardly, as shown, since the width of any ring is equal approximately to the height (the distance between the frustrums of the conical surfaces) multiplied by the tangent of the angle formed between the generating line of the oblique ring and the general plane of the screen. The radii of adjacent rings should ordinarily vary by about one-tenth inch or less so that the lines of juncture shall not be distinguishable a reasonable distance from the screen, and the surface therefore appear homogeneous. The generating lines of the cones may be curved when desired, and the surface of each ring provided with identical or different types of corrugations or beads of any desired configuration. The form of screen here shown may also be made of glass or other transparent or translucent material, provided with concentric rings for refracting the light, and silvered on the back, and having a ground surface for diffusing the light.

The several types of structures described above can readily be designed by those skilled in the art and by following the instructions set forth in this specification and in applicant's patents, aforesaid. Also metal plates comprising the improved forms of elements may be readily bent into reflector shapes for use as reflectors for billboard, automobile, or general illumination, or for any purpose requiring variable or uniform illumination through an angle of predetermined extent.

The modification shown in Figs. 27 and 28 forms the basis of the device shown in my co-pending application, Ser. No. 18241, series of 1925.

I claim:

1. A flat light-dispersive structure comprising a plurality of reflecting elements arranged oblique to each other, the angle of obliquity of the general surface of any given element with respect to the general surface of the element at the axis of the aforesaid structure being proportional to its distance from the said axis, substantially as described.

2. A light-dispersive structure composed of a plurality of juxtaposed, straight, parallel rows of reflecting elements, the angle between the general surfaces of any two adjacent rows being constant, substantially as described.

3. A flat structure comprising a plurality of reflecting, light-dispersive elements, corresponding points on the surfaces of which lie on concentric surfaces of revolution, substantially as described.

4. A flat structure comprising a plurality of reflecting, light-dispersive elements, corresponding points on the surfaces of which lie on concentric surfaces of revolution, the axis of the said surfaces of revolution passing through a given point on the said structure, substantially as described.

5. A flat structure comprising a plurality of reflecting, light-dispersive elements, corresponding points on the surfaces of which lie on concentric surfaces of revolution, the axis of the said surfaces of revolution passing through the centre of and being normal to the plane of the said structure, substantially as described.

6. A flat light-dispersive structure comprising a great plurality of closely adjacent, substantially equidistant, horizontal rows of light-reflecting elements, all of said rows being identical in configuration, but of uniformly and gradually increasing obliquity with respect to a given horizontal plane normal to the general surface of the aforesaid structure; substantially as described.

7. A flat structure having a great plurality of substantially juxtaposed facets which lie on concentric surfaces of revolution whose centre is in front of and on an axis perpendicular to the plane of said structure, the angles between adjacent facets being proportional to the distance between the centre-lines of said facets, the angle formed by any facet with respect to the plane of the aforesaid structure being proportional to the distance of the said facet from the aforesaid axis, and light reflecting means supported by said facets; substantially as described.

8. A flat structure having a great plurality of substantially juxtaposed facets which lie on concentric surfaces of revolution whose centre is in front of and on an axis perpendicular to the plane of said structure, the angles between adjacent facets being proportional to the distance between the centre-lines of said facets, the angle formed by any facet with respect to the plane of the aforesaid structure being proportional to the distance of the said facet from the aforesaid axis, all of the said facets supporting identical light-reflecting means each at the same angle with respect to the facet supporting it; substantially as described.

9. A light-dispersive structure composed of a plurality of juxtaposed, straight, parallel, transverse, horizontal rows of reflecting elements, the angle between the general surfaces of any two adjacent rows being constant, all transverse rows being of identical configuration, the general reflecting surface of successive rows of elements being at angles increasing by equal increments with respect to the general plane of the aforesaid structure; substantially as described.

10. A flat light-dispersive structure having a great plurality of facets which lie on concentric surfaces of revolution, facets equidistant from a given point in the plane of said structure being equally oblique to the said plane, the obliquity of any facet being proportional to its distance from the said given point, and a joining structure substantially normal to and connecting the said facets; substantially as described.

11. A flat structure comprising a great plurality of juxtaposed light-dispersive elements arranged oblique to the general plane of the said structure, so that normals to the elements from their middle points converge toward a common point in front of the said structure; substantially as described.

12. A flat structure comprising a great plurality of symmetrical light-dispersive elements of identical configuration, corresponding points on the surfaces of all of said elements lying on concentric surfaces of revolution; substantially as described.

13. A flat light-dispersive structure having a great plurality of reflecting elements adjacent to each other and oblique to the general surface of the said structure, each element being bounded by a periphery which is substantially rectangular in front elevation, two sides of said periphery being horizontal and two vertical, one or more sides of the periphery of each element being connected to a corresponding number of sides of the periphery of the next adjacent element by a joining surface of substantially uniform depth, said joining surface being substantially perpendicular to the general surfaces of the aforesaid adjacent elements, the depth of the vertical and horizontal joining surfaces being proportional to their distance from respectively a vertical and a horizontal plane which are normal to the aforesaid flat structure; substantially as described.

14. A flat light-dispersive structure comprising a great plurality of identical reflecting elements arranged in vertical and horizontal rows, the said elements being oblique to each other, the angle between adjacent elements in any horizontal row and the angle between adjacent elements in any vertical row being constant; substantially as described.

15. A flat light-dispersive structure comprising a great plurality of reflecting elements arranged in vertical and horizontal rows, the said elements being oblique to each other, the angles between adjacent elements being proportional to the distance between the centre-lines of said elements, the sum of all the angles between the general surfaces of adjacent elements in any horizontal row and the sum of the angles between the general surfaces of all the elements in any vertical row being equal respectively to the degrees of curvature horizontally and vertically of an equivalent spherical surface; substantially as described.

16. A flat structure comprising a plurality of reflecting light-dispersive elements oblique to each other, corresponding points of said elements lying on concentric surfaces, the angle between corresponding points of any two adjacent elements being proportional to the distance between the said corresponding points of said adjacent elements; substantially as described.

17. A flat structure made up of a plurality of light-dispersive elements, corresponding points on the surfaces of which lie on concentric surfaces of gradually varying radii; substantially as described.

PAUL L. CLARK.